(12) United States Patent  
Ramasamy et al.

(10) Patent No.: US 11,492,547 B2  
(45) Date of Patent: Nov. 8, 2022

(54) LOW-PH NANOPARTICLES AND LIGANDS

(71) Applicant: UbiQD, Inc., Los Alamos, NM (US)

(72) Inventors: Karthik Ramasamy, Santa Fe, NM (US); Hunter McDaniel, Los Alamos, NM (US); Chloe Castañeda, Los Alamos, NM (US)

(73) Assignee: UbiQD, Inc., Los Alamos, NM (US)

( * ) Notice: Subject to any disclaimer, the term of this patent is extended or adjusted under 35 U.S.C. 154(b) by 0 days.

(21) Appl. No.: 16/892,593

(22) Filed: Jun. 4, 2020

(65) Prior Publication Data

US 2021/0380877 A1  Dec. 9, 2021

(51) Int. Cl.
| | |
|---|---|
| *C09K 11/02* | (2006.01) |
| *C09K 11/88* | (2006.01) |
| *C09K 11/62* | (2006.01) |
| *B82Y 40/00* | (2011.01) |
| *B82Y 20/00* | (2011.01) |

(52) U.S. Cl.
CPC .......... *C09K 11/025* (2013.01); *C09K 11/621* (2013.01); *C09K 11/881* (2013.01); *C09K 11/883* (2013.01); *B82Y 20/00* (2013.01); *B82Y 40/00* (2013.01)

(58) Field of Classification Search
CPC ... C09K 11/025; C09K 11/883; C09K 11/881; C09K 11/621; B82Y 20/00; B82Y 40/00
See application file for complete search history.

(56) References Cited

U.S. PATENT DOCUMENTS

| | | |
|---|---|---|
| 3,765,014 A | 10/1973 | Taylor et al. |
| 6,878,184 B1 | 4/2005 | Rockenberger et al. |
| 7,351,358 B2 | 4/2008 | Hsu et al. |
| 7,371,456 B2 | 5/2008 | Nohr et al. |
| 7,390,438 B2 | 6/2008 | Hsu et al. |
| 7,427,323 B1 | 9/2008 | Birau et al. |
| 7,465,348 B1 | 12/2008 | Carlini et al. |
| 7,491,422 B2 | 2/2009 | Zhang et al. |
| 7,563,588 B2 | 7/2009 | Gao et al. |
| 7,579,074 B2 | 8/2009 | Berkei et al. |
| 7,591,872 B1 | 9/2009 | Jun et al. |
| 7,594,962 B2 | 9/2009 | Bujard et al. |
| 7,649,026 B2 | 1/2010 | Allen et al. |

(Continued)

FOREIGN PATENT DOCUMENTS

| | | |
|---|---|---|
| CN | 105131712 A | 12/2015 |
| CN | 105219163 B | 1/2016 |

(Continued)

OTHER PUBLICATIONS

Susumu, K. et al, "Purple-, Blue-, and Green-Emitting Multishell Alloyed Quantum Dots: Synthesis, Characterization, and Application for Ratiometric Extracellular pH Sensing", Chem. Mater. 2017, 29, pp. 7330-7344, Aug. 30, 2017.*

(Continued)

*Primary Examiner* — C Melissa Koslow  
(74) *Attorney, Agent, or Firm* — John A. Fortkort; Fortkort & Houston PC

(57) ABSTRACT

The present disclosure relates generally to nanoparticle formulations, and more specifically to nanoparticle and ligands used for imparting low-pH solubility in a range of solvents, including photoluminescent materials such as quantum dots.

19 Claims, 6 Drawing Sheets

(56) References Cited

U.S. PATENT DOCUMENTS

| | | | |
|---|---|---|---|
| 7,749,299 B2 | 7/2010 | Vanheusden et al. | |
| 7,749,300 B2 | 7/2010 | Chretien et al. | |
| 7,786,209 B2 | 8/2010 | Carlini et al. | |
| 7,789,935 B2 | 9/2010 | Chretien et al. | |
| 7,857,901 B2 | 12/2010 | Carlini et al. | |
| 7,883,574 B2 | 2/2011 | Carlini et al. | |
| 8,158,032 B2 | 4/2012 | Liu et al. | |
| 8,193,442 B2 | 6/2012 | Sager et al. | |
| 8,222,313 B2 | 7/2012 | Iftime et al. | |
| 8,227,022 B2 | 7/2012 | Magdassi et al. | |
| 8,257,740 B1 | 9/2012 | Sung et al. | |
| 8,282,860 B2 | 10/2012 | Chung et al. | |
| 8,287,637 B2 | 10/2012 | Carlini et al. | |
| 8,287,952 B2 | 10/2012 | Bringley et al. | |
| 8,319,916 B2 | 11/2012 | Matsumoto et al. | |
| 8,324,294 B2 | 12/2012 | Wu et al. | |
| 8,361,350 B2 | 1/2013 | Wu et al. | |
| 8,361,921 B2 | 1/2013 | Starz et al. | |
| 8,383,014 B2 | 2/2013 | Vanheusden et al. | |
| 8,404,160 B2 | 3/2013 | Li et al. | |
| 8,470,636 B2 | 6/2013 | Radu et al. | |
| 8,506,849 B2 | 8/2013 | Li et al. | |
| 8,558,117 B2 | 10/2013 | Hanson | |
| 8,586,141 B2 | 11/2013 | Birau et al. | |
| 8,597,420 B2 | 12/2013 | Iftime et al. | |
| 8,771,556 B2 | 7/2014 | Kim et al. | |
| 8,795,733 B1 | 8/2014 | Perez et al. | |
| 8,801,954 B2 | 8/2014 | Iftime et al. | |
| 8,815,394 B2 | 8/2014 | Carlini et al. | |
| 8,836,212 B2 | 9/2014 | Skipor et al. | |
| 8,889,429 B2 * | 11/2014 | Cao ..................... | C01B 19/007 436/525 |
| 8,911,545 B2 | 12/2014 | Enomura | |
| 9,105,796 B2 | 8/2015 | Cao et al. | |
| 9,211,510 B2 | 12/2015 | Enomura | |
| 9,228,098 B2 | 1/2016 | Eron | |
| 9,289,508 B2 | 3/2016 | Reshetnyak et al. | |
| 9,353,267 B2 | 5/2016 | Almog et al. | |
| 9,422,443 B2 | 8/2016 | Iguchi et al. | |
| 9,730,333 B2 | 8/2017 | Li et al. | |
| 9,833,836 B2 | 12/2017 | Magdassi et al. | |
| 9,834,447 B2 | 12/2017 | Lockett et al. | |
| 10,087,082 B2 | 10/2018 | Schlenoff | |
| 10,311,994 B2 | 6/2019 | He et al. | |
| 10,538,672 B2 | 1/2020 | Ajiri | |
| 10,590,295 B2 | 3/2020 | Grouchko et al. | |
| 2007/0096057 A1 | 5/2007 | Hampden-Smith et al. | |
| 2007/0144305 A1 | 6/2007 | Jablonski et al. | |
| 2009/0099282 A1 | 4/2009 | Muller et al. | |
| 2009/0220792 A1 | 9/2009 | Ying et al. | |
| 2009/0274834 A1 | 11/2009 | Chopra et al. | |
| 2010/0178512 A1 | 7/2010 | Giesenberg et al. | |
| 2010/0330220 A1 | 12/2010 | Gratson et al. | |
| 2011/0059467 A1 | 3/2011 | Ting et al. | |
| 2011/0143051 A1 | 6/2011 | Ohashi et al. | |
| 2011/0207232 A1 | 8/2011 | Ostafin et al. | |
| 2013/0299745 A1 | 11/2013 | Mattoussi et al. | |
| 2015/0284493 A1 | 10/2015 | Mattoussi et al. | |
| 2015/0307666 A1 | 10/2015 | Kodas et al. | |
| 2017/0029693 A1 | 2/2017 | Willi et al. | |
| 2017/0058056 A1 | 3/2017 | Mattoussi et al. | |
| 2019/0010620 A1 | 1/2019 | Kaczur et al. | |
| 2019/0177560 A1 | 6/2019 | Omenetto et al. | |

FOREIGN PATENT DOCUMENTS

| | | |
|---|---|---|
| CN | 105315792 B | 2/2016 |
| CN | 105694590 B | 6/2016 |
| CN | 106009930 B | 7/2016 |
| CN | 109354924 B | 2/2019 |
| EP | 3480275 A1 | 5/2019 |
| JP | 4851323 B2 | 1/2012 |
| WO | 2005084092 A2 | 9/2005 |
| WO | 2018054190 A1 | 3/2018 |

OTHER PUBLICATIONS

Susumu, K. et al, "Purple-, Blue-, and Green-Emitting Multishell Alloyed Quantum Dots: Synthesis, Characterization, and Application for Ratiometric Extracellular pH Sensing", Chem. Mater. 2017, 29, supporting information, Aug. 30, 2017.*

Dominik Voigt, Michael Bredol, Atoosa Gonabadi, "A general strategy for CuInS2 based quantum dots with adjustable surface chemistry", Optical Materials, vol. 115 (May 11, 2021) 110994, ISSN 0925-3467, https://doi.org/10.1016Zj.optmat.2021.110994.

Umar et al. (2018). "Investigation of the effect of pH adjustment on the stability of nanofluid " AIP Conference Proceedings 2031, 020031.

McDaniel, H., Fuke, N., Makarov, N. S., Pietryga, J. M., Klimov, V. I. (2013). An integrated approach to realizing high-performance liquid-junction quantum dot sensitized solar cells. Nature Communications, 4(1). doi:10.1038/ncomms3887.

Avramescu, M. L. (2017). Influence of pH, particle size and crystal form on dissolution behaviour of engineered nanomaterials. Environ Sci Pollut Res, 24, 1553-1564. doi:10 1007/s11356-016-7932-2.

Venditti, I. et al. (2017). Hydrophilic Metal Nanoparticles Functionalized by 2-Diethylaminoethanethiol: A Close Look at the Metal-Ligand Interaction and Interface Chemical Structure. The Journal of Physical Chemistry, 14(121), 8002-8013. doi:10.1021/acs.jpcc. 7b01424.

Qin, B. et al. (2008). A Temperature-Driven Reversible Phase Transfer of 2-(Diethylamino)ethanethiol-Stabilized CdTe Nanoparticles. A Temperature-Driven Reversible Phase Transfer of 2-(Diethylamino)ethanethiol-Stabilized CdTe Nanoparticles, 7(20). doi:10.1002/anie.200803582.

Zhan, N. et al. (2013). Multidentate Zwitterionic Ligands Provide Compact and Highly Biocompatible Quantum Dots. Journal of the American Chemical Society, 135, 13786-13795. doi:10.1021/ja405010vl.

Stolle, J. et al. (2013). Nanocrystal photovoltaics: a review of recent progress. Current Opinion in Chemical Engineering. 2, 160-167. doi:10.1016/j.coche.2013.03.001.

Tan, Z. et al. (2011). Near-Band-Edge Electroluminescence from Heavy-Metal-Free Colloidal Quantum Dots. Advanced Materials. 23, 3553-3558. doi:10.1002/adma.201100719.

Ploetz, E. (Apr. 17, 2020). Nanoparticles: Acidic alert. Retrieved Sep. 6, 2020, from https://www.sciencedaily.com/releases/2020/04/200417125509.htm.

Chen He, Zhengyi Zhang, Chen Wang, Yishu Jiang, and Emily A. Weiss. "Reversible Modulation of the Electrostatic Potential of a Colloidal Quantum Dot through the Protonation Equilibrium of its Ligands". (2017) The Journal of Physical Chemistry Letters. 8(20), 4981-4987.

Mukha, I. et al. The pH-Dependent Stucture and Properties of Au and Ag Nanoparticles Produced by Tryptophan Reduction. Nanoscale Res Lett (2016) 101-107, 11. Springer Open, New York, NY, USA. https://doi.org/10.1186/s11671-016-1318-8.

Tan, Y. et al. Highly Luminescent and Stable Perovskite Nanocrystals with Octylphosphonic Acid as a Ligand for Efficient Light-Emitting Diodes. ACS Applied Materials & Interfaces (2018) 3784-3792,10 (4), ACS Publications, Washington, DC, USA. DOI: 10.1021/acsami. 7b17166.

Han, T. Self-Electrochemiluminescence of CdTe Nanocrystals Capped with 2-Diethylaminoethanethiol. Chemical Communications. (2017), 5388-5391, 53, Royal Society of Chemistry, London, United Kingdom. doi:10.1039/C7CC01955F.

Chen He, Zhengyi Zhang, Chen Wang, Yishu Jiang, and Emily A. Weiss. Reversible Modulation of the Electrostatic Potential of a Colloidal Quantum Dot through the Protonation Equilibrium of its Ligands. The Journal of Physical Chemistry Letters (2017), 4981-4987, 8(20). ACS Publications, Washington, DC, USA. 10.1021/acs.ipclett.7b02101.

Liang, X. et al. Synthesis of Unstable Colloidal Inorganic Nanocrystals through the Introduction of a Protecting Ligand NanoLetters (2014), 3117-3123, 14. ACS Publications, Washington, DC, USA dx.doi.org/10.1021/nl501763z.

(56) References Cited

OTHER PUBLICATIONS

Rajan, K. et al. Silver Nanoparticle Ink Technology: State of the Rrt. Nanotechnology, Science and Applications (2016) 1-13, 9. Dove Medical Press, Macclesfield, United Kingdom. doi:10.2147/NSA.S68080.

Susumu, K. et al. Purple-, Blue-, and Green-Emitting Multishell Alloyed Quantum Dots: Synthesis, Characterization, and Application for Ratiometric Extracellular pH Sensing. Chemistry of Materials (2017) 7330-7344, 29. ACS Publications, Washington, DC, USA. doi:10.1021/acs.chemmater.7b02174.

Park, S. et al. Reversibly pH-Responsive Gold Nanoparticles and their Applications for Photothermal Cancer Therapy (2019) 1-9, 9. Springer Nature, New York, NY, USA. doi:10.1038/s41598-019-56754-8.

Fernandes, I. et al. Silver Nanoparticle Conductive Inks: Synthesis, Characterization, and Fabrication of Inkjet-Printed Flexible Electrodes (2020) 1-11, 10. Springer Nature, New York, NY, USA. doi:10.1038/s41598-020-65698-3.

Gaponik, N. et al. Thiol-Capping of CdTe Nanocrystals: An Alternative to Organometallic Synthetic Routes (2002) 7177-7185, 106. ACS Publications, Washington, DC, USA. doi:10.1021/jp025541k.

Zhong, H. et al. Tuning the Luminescence Properties of Colloidal I-III-VI Semiconductor Nanocrystals for Optoelectronics and Biotechnology Applications (2012) 3167-3175, 3. ACS Publications, Washington, DC, USA. doi:10.1021/jz301345xl.

\* cited by examiner

LOW-PH NANOPARTICLES AND LIGANDS

FIELD OF THE DISCLOSURE

The present disclosure relates generally to nanoparticle formulations, and more specifically to such formulations in which ligands are used for imparting low-pH dispersibility to nanoparticles in a range of solvents, including photoluminescent nanoparticle materials such as quantum dots.

BACKGROUND OF THE DISCLOSURE

Photoluminescence (PL) is the emission of light (electromagnetic radiation, in the form of photons) after the absorption of light. It is one form of luminescence (light emission) and is initiated by photoexcitation (excitation by photons). Following photoexcitation, various charge relaxation processes may occur in which other photons with a lower energy are re-radiated on some time scale. The energy difference between the absorbed photons and the emitted photons, also known as the Stokes shift, can vary widely across materials, and ranges from nearly zero to 1 eV or more. Time periods between absorption and emission may also vary widely across materials and may range from the short femtosecond-regime (for emissions involving free-carrier plasma in inorganic semiconductors) up to milliseconds (for phosphorescent processes in molecular systems). Under special circumstances, delay of emission may even span minutes or even hours. Furthermore, for a given material (or mixture of materials), the emission lifetime may depend on factors such as the excitation and emission wavelength.

In acidic solutions, nanoparticles are generally unstable and typically do not exhibit photoluminescence emission. There are several reasons for this. First of all, low-pH conditions are highly acidic and corrosive, and often digest nanomaterials. Moreover, the polar environment of acidic solutions leads to nanoparticle surface charging and the presence of chemical species on the surface, which introduces non-radiative recombination pathways. Consequently, most nanoparticle syntheses occur in non-polar solvents, such as octadecene or octyl ether, and most nanoparticles are not dispersible in polar media such as ethanol or water.

SUMMARY OF THE DISCLOSURE

Figure 1:
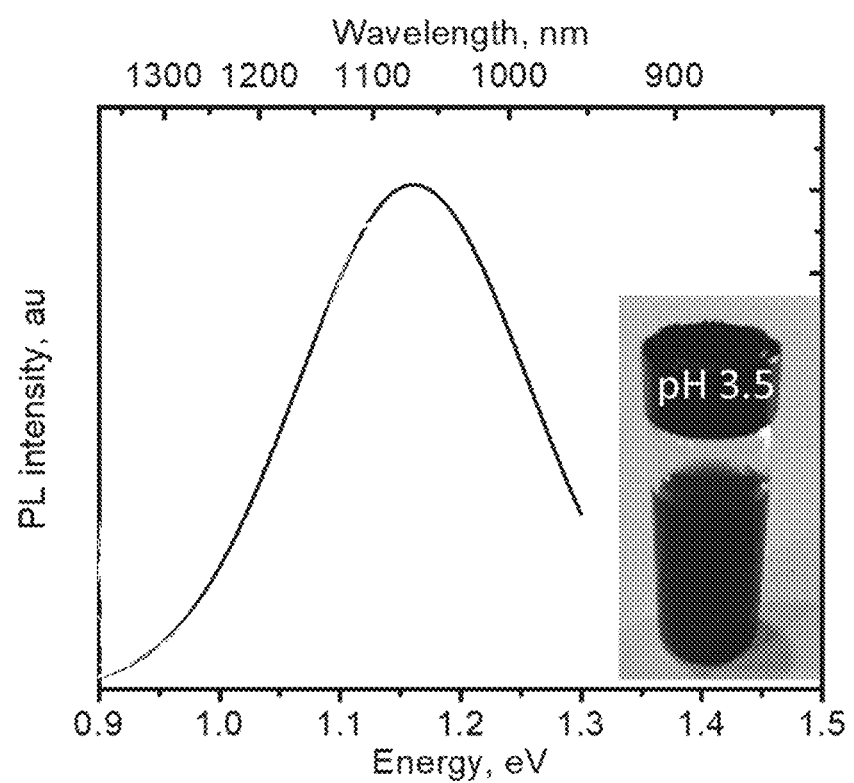
FIG. 1 is a graph of a typical photoluminescence spectra of $CuInSe_xS_{2-x}/ZnS$ quantum dots in ethanol/water solution at pH 3.5. The inset is a picture of $CuInSe_xS_{2-x}/ZnS$ quantum dots in ethanol/water solution at pH 3.5.

In one aspect, a composition is provided which comprises (a) a liquid medium with a pH of less than 6; and (b) a plurality of nanoparticles suspended in said liquid medium, wherein each of said plurality of nanoparticles includes a nanoparticle and a ligand; wherein said plurality of nanoparticles, upon excitation with a light source, undergo photoluminescence and exhibit a quantum yield greater than 1%.

In another aspect, a nanoparticle is provided which comprises (a) a nanoparticle containing an inorganic material selected from the group consisting of $CuInS_2$, $CuInSe_2$, $AgInS_2$, $AgInSe_2$, ZnS and ZnSe; and (b) a plurality of ligands selected from the group consisting of amines, thiols, aminothiols, 2-(diethylamino)ethanethiol and 3-(dimethylamino)propanethiol.

In a further aspect, a composition is provided which comprises a plurality of acid-stable nanoparticles, wherein each nanoparticle contains (a) a core comprising a semiconductor, (b) at least one shell which at least partially surrounds the core, and (c) at least one ligand attached to said at least one shell.

In still another aspect, a method for making acidic stable nanoparticles is provided which comprises (a) synthesizing a plurality of core nanoparticles by (i) mixing a first at least one metal salt in a first organic solution under an inert atmosphere, thereby obtaining a first mixture, and (ii) heating said first organic solution to a first temperature; (b) creating at least one shell on each of the plurality of core nanoparticles by (i) mixing the plurality of core nanoparticles with a second at least one metal salt, thereby obtaining a second mixture, and (ii) heating the second mixture to a second temperature; and (c) adding a capping agent to the nanoparticles by (i) mixing the nanoparticles with a ligand solution, and (ii) heating the ligand solution to at third temperature.

In a further aspect, an acid stable solution is then utilized for further processing where the stability of the material is unexpectedly improved.

DETAILED DESCRIPTION

1. Background

Colloidal semiconductor nanoparticles, commonly known as quantum dots (QDs), provide various size-tunable optical properties, including photoluminescence (PL), and may be inexpensively processed from liquids. In particular, they are very effective at absorbing a broad spectrum of light and then converting that energy into emitted light of a single color that is determined by their size. Optical properties (such as, for example, absorption and emission spectra, PL lifetimes and Stokes shifts) may be programmed into these materials by tailoring the manufacturing conditions to realize different sizes, shapes, compositions, and/or heterostructuring. This fundamental property of QDs has spurred research and development of fluorescence biolabeling, color-specific light-emitting-diodes, and vibrant displays. However, the current generation of QDs are toxic and far too expensive to reach most markets. There is thus a unique opportunity for QDs that are both low-cost and non-toxic as active elements of luminescent composites for various applications (e.g., lighting, solar, safety, design, security inks, and agriculture).

Typically, colloidal nanoparticles are synthesized in long chain organic surfactant solutions. Consequently, the nanoparticles are capped with surfactant ligands that provide dispersibility in non-polar organic solutions. To make nanoparticles dispersible in polar solvents like water or alcohol, the ligand may be replaced with short chain compounds. Well-known examples of short chain ligands that provide dispersibility in polar solvents include 3-mercaptopropionic acid, thioglycerol, polyvinyl alcohol and polyethylene glycol. However, while these ligands provide dispersibility in neutral or basic solutions, they are digested in acidic solutions. At present, no luminescent nanoparticles are known to the art which are stable in solution at low pH conditions. This places significant constraints on both the manner in which such nanoparticles may be synthesized, and the manner in which such nanoparticles may be used or incorporated into different media for various applications.

Gaponik, et. al. synthesized CdTe nanoparticles in which $Cd(ClO_4)_2$ was dissolved in water and one of the thiol compounds 2-mercaptoethanol, 1-thioglycerol, 2-mercaptoethylamine, L-cysteine or 2-(dimethylamino)ethanethiol was added. The pH of the mixture was subsequently adjusted to 5-6 using NaOH before bubbling highly toxic $H_2Te$ gas through it for 30 min. The resulting mixture was stirred for 2-3 days to get 5 nm nanoparticles. Although this process describes the use of 2-(dimethylamino)ethanethiol ligand for the synthesis of CdTe nanoparticles, it did not demonstrate stable photoluminescence emission or the formation of a stable solution at corrosive pHs (about 3.0). Moreover, this approach is limited to only toxic CdTe nanoparticles without a core/shell structure. See "Thiol-capping of CdTe nanoparticles: An alternative to organometallic synthetic routes", Nikolai Gaponik, et. al., J. Phys. Chem. B 2002, 106, 7177-7185. See also "A temperature driven reversible phase transfer of 2-(dimethylamino)ethanethiol stabilized CdTe nanoparticles", Bing Qin, et. al., Angew. Chem. Int. Ed. 2008, 47, 9875-9878.

Han et. al. synthesized 2-(dimethylamino)ethanethiol capped CdTe nanoparticles by a ligand exchange process in which original CdTe nanoparticles were capped with 3-mercaptopropinonic acid. It was found that 2-(dimethylamino) ethanethiol capped CdTe nanoparticles exhibited electrochemiluminescence by applying electrical potential. However, this work did not include stabilization of nanoparticles at low pH. See "Self-electroluminescence of CdTe nanoparticles capped with 2-(dimethylamino)ethanethiol", Ting-Ting Han, et. al., Chem Commun., 2017, 53, 5388.

Gold and silver nanoparticles have been synthesized with 2-(dimethylamino)ethanethiol ligands to provide water dispersibility. It has been very well documented that metal nanoparticles such as gold and silver are thiophilic. Most of the syntheses involve thiol as a capping agent. As expected, these particles do not exhibit photoluminescence emission. See, e.g., "Hydrophilic metal nanoparticles functionalized by 2-(dimethylamino)ethanethiol: A close look at the metal-ligand interaction and interface chemical structure", Iole Venditti, et. al., J. Phys. Chem. C. 2017, 121, 8002.

He et al. described the reversible modulation of the electrostatic potential at the interface between a colloidal PbS quantum dot (QD) and solvent through the protonation equilibrium of the histamine-derivatized dihydrolipoic acid (DHLA) ligand shell of a QD. The electrostatic potential was sensitively monitored by the yield of photoinduced electron transfer from the QD to a charged electron acceptor, 9,10-anthraquinone-2-sulfonate (AQ). The permeability of the DHLA coating to the AQ progressively was found to increase as the average degree of protonation of the ligand shell increased from 0 to 92% (as quantified by 1H NMR) upon successive additions of p-toluenesulfonic acid. This increase resulted in a decrease in the photoluminescence (PL) intensity of the QDs by a factor of 6.7. The increase in permeability was attributable to favorable electrostatic interactions between the ligands and AQ. This work suggests the potential of the combination of near-IR-emitting QDs and molecular quenchers as robust local H+ sensors. Although this paper describes the use of complex and expensive ligands which contain thiol and histamine functional groups, it does not address stabilization of QDs in low pH solution. See "Reversible modulation of the electrostatic potential of a colloidal quantum dot through the protonation equilibrium of its ligands", He et. al., J. Phys. Chem. Lett. 2017, 8, 4981.

$Cd_xZn_{1-x}Se/Cd_yZn_{1-y}S/ZnS$ and $ZnSe/Cd_yZn_{1-y}S/ZnS$ (where $0 \leq x,y \leq 1$) multi-shell alloyed luminescent quantum dots have been synthesized. To make them water dispersible, the surfaces of the QDs were capped with dihydrolipoic acid attached with polyethyleneglycol amine. The as-prepared QDs had fluorescence quantum yields (~30-55%), narrow fluorescence bands (fwhm ~25-35 nm), and monodispersed semispherical shapes. Ligand exchange with hydrophilic compact ligands was successfully carried out to prepare a series of water-dispersible blue-emitting QDs. QDs coated with the hydrophilic compact ligands preserved the intrinsic photophysical properties well and showed excellent colloidal stability in aqueous buffers for over a year. The blue-emitting QDs were further conjugated with the pH-sensitive dye, fluorescein isothiocyanate (FITC), to construct a fluorescence resonance energy transfer-based ratiometric pH sensing platform, and pH monitoring with the QD-FITC conjugates was successfully demonstrated at pHs ranging between 3 and 7.5. Further assembly of the QD-FITC conjugates with membrane localization peptides allowed monitoring of the pH in extracellular environments. See, e.g., "Purple, blue and green emitting multishell alloyed quantum dots: Synthesis, characterization and application for ratiometeric extracellular pH sensing", C Kimihiro Susumu, et. al., Chem Mater., 2017, 29, 7330.

Ligand capped CdSe/ZnS QDs have been synthesized which are water dispersible, and which are of a dihydrolipoic acid derived zwitterion type. These ligands permitted metalhistidine self-assembly between QDs photoligated with bis(LA)-ZW and two different His-tagged proteins, maltose binding protein and fluorescent mCherry protein. See Naiqian Zhan, el. al., Mulidentate zwitterionic ligands provide compact and highly biocompatible quantum dots. J. Am. Chem. Soc., 2013, 135, 13786. Stabilization of QDs in acidic solution was not reported.

Nanoparticle quantum dots of the class of semiconductors, such as CuInS2, are of growing interest for applications in optoelectronic devices such as solar photovoltaics (see, e.g., PVs, Stolle, C. J.; Harvey, T. B.; Korgel, B. A. Curr. Opin. Chem. Eng. 2013, 2, 160) and light-emitting diodes (see, e.g., Tan, Z.; Zhang, Y.; Xie, C.; Su, H; Liu, J.; Zhang, C.; Dellas, N.; Mohney, S. E.; Wang, Y.; Wang, J.; Xu, J. Advanced Materials 2011, 23, 3553). These quantum dots exhibit strong optical absorption and stable efficient photoluminescence that can be tuned from the visible to the near-infrared (see, e.g., Zhong, H.; Bai, Z.; Zou, B. J. Phys. Chem. Lett. 2012, 3, 3167) through composition and quantum size effects. In fact, Gratzel cells sensitized by specifically engineered quantum dots have recently been shown to offer excellent stability and certified power conversion efficiencies of >5% (see McDaniel, H; Fuke, N.; Makarov, N. S.; Pietryga, J. M.; Klimov, V. I. Nat. Commun. 2013, 4, 2887). Alloyed $CuInSe_xS_{2-x}/ZnS$ QDs are particularly attractive because of their low toxicity, long term stability, nearly ideal PL lifetime, and other unique optical properties.

Toxicity is another issue encountered in QD applications. Most QD materials available today are highly hazardous. The use of cadmium-based fluorophores is a non-starter for most applications, since it is a known carcinogen that bio-accumulates in the human body. The most common cadmium-free QD material, indium phosphide, is also a known carcinogen. For near-IR emission, lead-based QDs are typically utilized, despite the fact that the toxicity of lead-based materials is well known. There is a clear and urgent need for QD fluorophores which are non-toxic and non-carcinogenic.

2. Overview

Full spectrum (visible to near-IR, 400-1400 nm) photoluminescent QD materials are needed for a host of applications. Acid-stable mixtures of QDs are frequently desirable in many of these applications. Existing methods for preparing QD materials have been found to be inadequate for obtaining stable, low-pH formulations. There is thus a need in the art for stable, low-pH QD formulations, and for methods for making the same. There is further a need in the art for stable, low-pH QD formulations with long PL lifetimes that are composed of safe compounds containing inorganic materials (such as, for example, those selected from the group consisting of $CuInS_2$, $CuInSe_2$, $AgInS_2$, $AgInSe_2$, ZnS and ZnSe).

Novel, acid-stable QDs are disclosed herein which, in a preferred embodiment, contain non-carcinogenic QDs having tunable PL spectra with peaks in the visible (400-650 nm) to near-IR (650-1400 nm) and spectrally varying PL lifetimes which are preferably within the range of 100-1000 ns. In some embodiments, multiple sizes and/or compositions of QD emitters may be utilized in various ratios to achieve mixtures having desired spectral and/or temporal characteristics that are different from those of the individual component QDs. It will thus be appreciated that the addition of a second QD composition to a first QD composition may be utilized to modify the spectrum and/or temporal characteristics of the first QD. $CuInSe_xS_{2-x}/ZnS$ (where $0 \leq x \leq 2$) QDs are a preferred (though non-limiting) photoluminescent material for this purpose.

Preferred embodiments of the compositions, systems and methodologies disclosed herein represent an improvement over previous generations of QDs. In particular, the preferred QDs which are the subject of these compositions and methodologies are stable at lower pHs (e.g., less than about 6, less than 3.5, or within the range of 2.5 to 3.1) than is the case for most prior art QDs, thus allowing them to form clear colloidal dispersions in a liquid medium at these pH values. Consequently, these QDs may be synthesized by, and utilized in, processes that would not be suitable or possible for such prior art QDs. Moreover, since many applications require pHs of less than 6, these QDs may be used with more utility than is possible with such prior art QDs.

3. Definitions and Abbreviations

The following explanations of terms and abbreviations are provided to better describe the present disclosure and to guide those of ordinary skill in the art in the practice of the systems, methodologies and compositions disclosed herein.

As used herein, "comprising" means "including", and the singular forms "a" or "an" or "the" include plural references unless the context clearly indicates otherwise. Unless the context clearly indicates otherwise, the term "or" is inclusive, and thus refers to both a single element of stated alternative elements and a combination of two or more of those elements.

Unless explained otherwise, all technical and scientific terms used herein have the same meaning as commonly understood to one of ordinary skill in the art to which this disclosure relates. Suitable methods and compositions are described herein for the practice or testing of the compositions, systems and methodologies described herein. However, it is to be understood that other methods and materials similar, or equivalent to, those described herein may be used in the practice or testing of these compositions, systems and methodologies. Consequently, the compositions, systems, methodologies and examples disclosed herein are illustrative only, and are not intended to be limiting. Other features of the present disclosure will be apparent to those skilled in the art from the following detailed description and the appended claims.

Unless otherwise indicated, all numbers expressing quantities of components, percentages, temperatures, times, and so forth as used in the specification or claims are to be understood as being modified by the term "about." Unless otherwise indicated, non-numerical properties such as colloidal, continuous, crystalline, and so forth as used in the specification or claims are to be understood as being modified by the term "substantially," meaning to a great extent or degree. Accordingly, unless otherwise indicated implicitly or explicitly, the numerical parameters and/or non-numerical properties set forth herein are approximations, and the optimal values of these parameters or properties may depend on the desired properties sought, the limits of detection under standard test conditions or methods, the limitations of the processing methods, and/or the nature of the parameter or property. When directly and explicitly distinguishing embodiments from disclosed prior art, the embodiment numbers are not approximations unless the word "about" is recited.

Carcinogen: A material that has been shown to directly or indirectly cause cancer in any mammal.

Colloidal Suspension: A mixture consisting of a disperse phase (the suspended particles) and a continuous phase (the liquid medium of suspension), wherein the mixture either does not settle, or would take a very long time to settle appreciably.

Di spersibility: The ability of QDs to form a colloidal suspension.

Flocculation: A process whereby the disperse phase in a colloidal suspension forms aggregates and comes out of suspension.

Solubility: When used in reference to QDs, the ability of QDs to form a clear colloidal suspension without haze caused by the formation of aggregates.

Nanoparticle: A nanoscale particle of solid material. The nanoparticles disclosed herein preferably are crystalline and have a size of less than about 500 nm. The nanoparticles disclosed may form a colloidal suspension. Embodiments of the disclosed nanoparticles may be of a single material, or may comprise an inner core and an outer shell. The nanoparticles may further include a plurality of ligands bound to the nanoparticle surface. Exemplary nanoparticles which may be utilized in the compositions, systems and methodologies described herein may comprise metals, metal oxides, metal chalcogenides, semiconductors, and insulators.

Photoluminescence (PL): The emission of light (electromagnetic radiation, in the form of photons) after the absorption of light. It is one form of luminescence (light emission) and is initiated by photoexcitation (excitation by photons).

Polymer: A large molecule, or macromolecule, composed of many repeated subunits. Polymers range from familiar synthetic plastics such as polystyrene or poly(methyl methacrylate) (PMMA), to natural biopolymers such as DNA and proteins that are fundamental to biological structure and function. Polymers, both natural and synthetic, are created via polymerization of many smaller molecules, known as monomers. Exemplary polymers include poly(methyl methacrylate) (PMMA), polystyrene, silicones, epoxy resins, and nail polish.

Toxic: Denotes a material that can damage living organisms due to the presence of phosphorus or heavy metals such as cadmium, lead, or mercury.

Quantum Dot (QD): A nanoparticle that exhibits size-dependent electronic and optical properties due to quantum confinement. The quantum dots disclosed herein preferably have at least one dimension less than about 50 nanometers. The disclosed quantum dots may be colloidal quantum dots. Some of the quantum dots which may be utilized in the compositions, systems and methodologies described herein are made from a binary semiconductor material having a formula MX, where M is a metal and X typically is selected from sulfur, selenium, tellurium, nitrogen, phosphorus, arsenic, antimony or mixtures thereof. Exemplary binary quantum dots which may be utilized in the compositions, systems and methodologies described herein include CdS, CdSe, CdTe, PbS, Pb Se, PbTe, ZnS, ZnSe, ZnTe, InP, InAs, $Cu_2S$, and $In_2S_3$. Other quantum dots which may be utilized in the compositions, systems and methodologies described herein are ternary, quaternary, and/or alloyed quantum dots including, but not limited to, ZnSSe, ZnSeTe, ZnSTe, CdSSe, CdSeTe, HgSSe, HgSeTe, HgSTe, ZnCdS, ZnCdSe, ZnCdTe, ZnHgS, ZnHgSe, ZnHgTe, CdHgS, CdHgSe, CdHgTe, ZnCdSSe, ZnHgSSe, ZnCdSeTe, ZnHgSeTe, CdHgSSe, CdHgSeTe, $CuInS_2$, $CuInSe_2$, $CuInGaSe_2$, $CuInZnS_2$, $CuZnSnSe_2$, $CuIn(Se,S)_2$, $CuInZn(Se,S)_2$, and $AgIn(Se,S)_2$ quantum dots, although the use of non-toxic quantum dots is preferred. Embodiments of the disclosed quantum dots may be of a single material, or may comprise an inner core and an outer shell (e.g., a thin outer shell/layer formed by any suitable method, such as cation exchange). The quantum dots may further include a plurality of ligands bound to the quantum dot surface.

Emission spectrum: Those portions of the electromagnetic spectrum over which QDs (or a composition containing them) exhibit PL (in response to excitation by a light source) whose amplitude is at least 1% of the peak PL emission.

4. Best Mode

Figure 2:
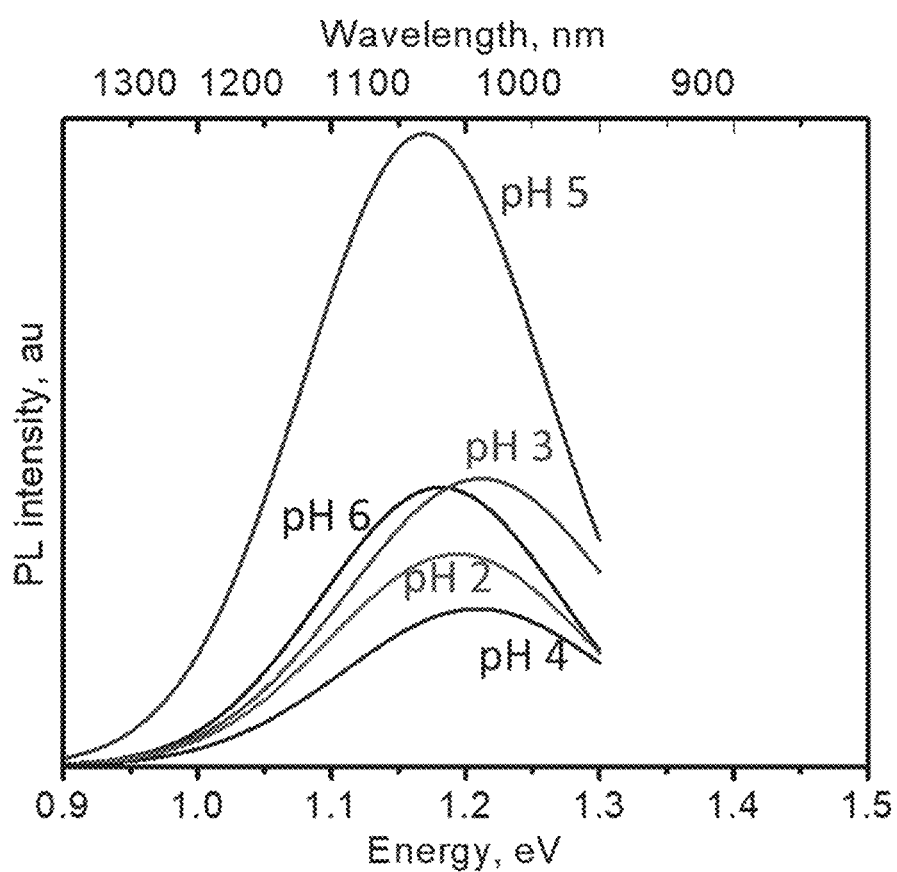
FIG. 2 is a graph of a typical photoluminescence spectra of $CuInSe_xS_{2-x}/ZnS$ quantum dots in an ethanol/water solution at different pH conditions.
Figure 3:
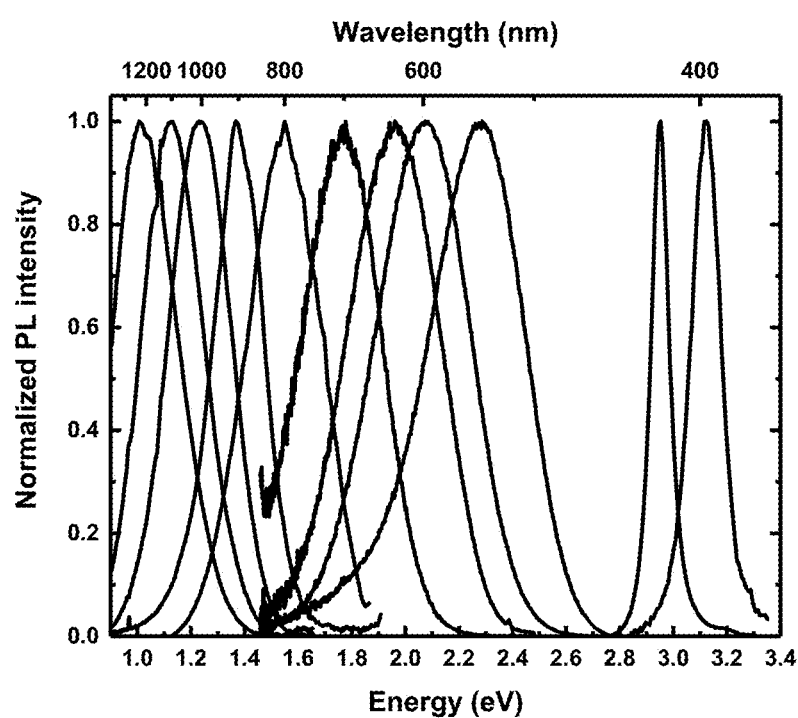
FIG. 3 is a graph of the photoluminescence spectra arising from different sizes and compositions of quantum dots composed of $CuInS_2$, $CuInSe_2$, ZnS, ZnSe, and combinations thereof. As seen therein, these materials provide accessible peak emissions within the range of 400 nm-1300 nm.

Preferred embodiments of the systems and methodologies disclosed herein include a stable dispersion of nanoparticles in a mixture of ethanol and water at pH values less than 6. Said nanoparticles are preferably luminescent and maintain said luminescence even at pH values as low as 3.5 (FIG. 1) or even 2 (FIG. 2). Exemplary luminescence spectra are shown in FIG. 3, which may have peak emissions of 400 to 1300 nm. Preferably, the nanoparticles have an outer shell of ZnS with at least one amino thiol ligand, and more preferably, a 2-(diethylamino)ethanethiol ligand. Almost any core nanoparticle may be used in principle, although the use of $CuInS_2$ and related compounds (including off-stoichiometry compounds) is preferred. $CuInSe_xS_{2-x}/ZnS$ (where $0 \le x \le 2$) nanoparticles that have been partially recapped with 2-(diethylamino)ethanethiol, and which may be readily dissolved or dispersed into a mixture of water and ethanol at pH values between 2 and 4, are especially preferred. These nanoparticles have bright and stable photoluminescence with a peak in the range of 400 nm to 1300 nm.

5. Examples

The following examples are non-limiting, and are merely intended to further illustrate the compositions, systems and methodologies disclosed herein.

Example 1

This example illustrates the single-pot synthesis of corrosion resistant quantum dots.

In a deaerated round bottom flask, a solution of quantum dot cores was reacted with solution containing zinc acetate, oleic acid, octadecene and 1-dodecanethiol at a temperature within the range of 100 and 300° C., thereby forming a shell. The resulting $CuInSe_xS_{2-x}/ZnS$ (where $0 \le x \le 2$) quantum dots were treated with solution of 2-(diethylamino)ethanethiol between 100-150° C. from 60 min to 24 h.

Example 2

This example illustrates the relationship between quantum yield (QY) and pH for corrosion resistant quantum dots of the type disclosed herein.

Figure 4:
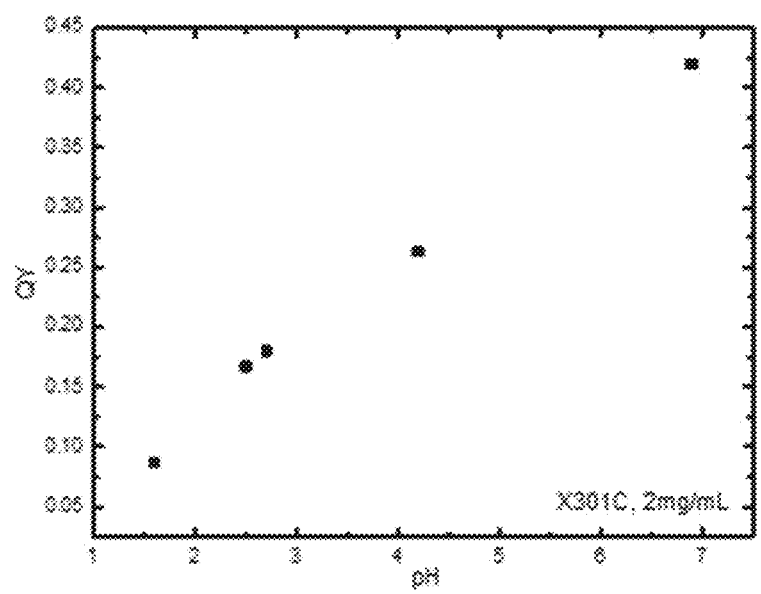
FIG. 4 is a graph of quantum yield (QY) as a function of pH. As seen therein, QY ranges from about 10% at pH 1.5 to 40% at pH 7 for the particular QDs tested.

A concentrated dispersion of amino ligands and the QDs from EXAMPLE 1 was prepared and its QY and pH were measured. Further, the pH of the solution was adjusted several times by adding drops of acid, and the QY and pH of the solution was measured each time. As a result, a true dependence of the QY vs. pH was observed. These results are depicted in FIG. 4.

These experiments also showed that higher-concentration QDs better survive low-pH conditions. In particular, a QY of a few percent was observed even at the lowest pH for the higher-concentration QDs, while for the lower QD concentrations, the low pH solutions had almost zero QY.

Without wishing to be bound by theory, it is suspected that the low pH suspension may be composed of charged QDs. At high concentrations, the pH rises too much, and the dots may be aggregating too extensively to remain in a colloidal suspension. Systematic measurement of the QDs, at different concentrations and pH conditions, shows that quantum yield (QY) is inversely correlated with dispersibility, because higher concentrations and higher pH values result in higher QY (as the QDs lose dispersibility). Charged QDs are expected to have lower QY due to fast non-radiative Auger recombination.

Example 3

This example illustrates the dispersibility of corrosion resistant quantum dots made in accordance with the teachings herein.

Figure 5:
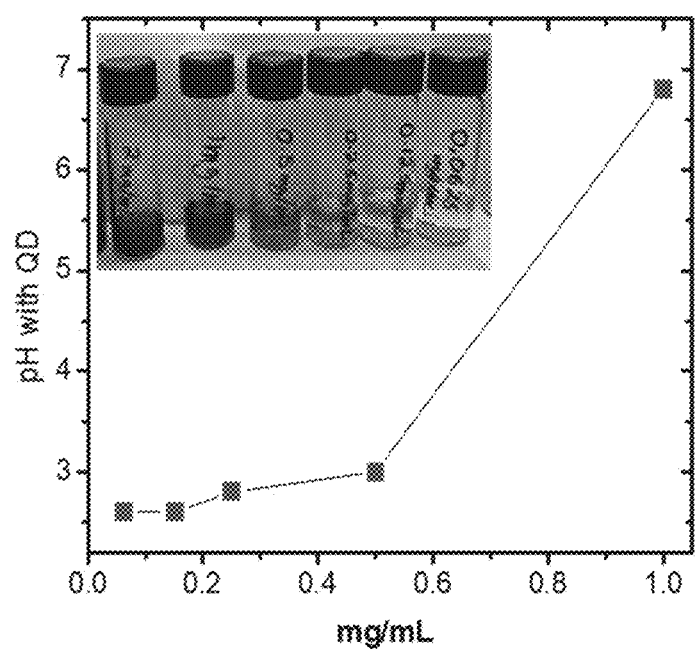
FIG. 5 is a graph of pH as a function of QD concentration. The inset is a picture of several $CuInSe_xS_{2-x}/ZnS$ QDs solutions arranged at decreasing concentrations. Solutions at <2 mg/mL dispersed well in ethanol/water solution at pH<3.0.
Figure 6:
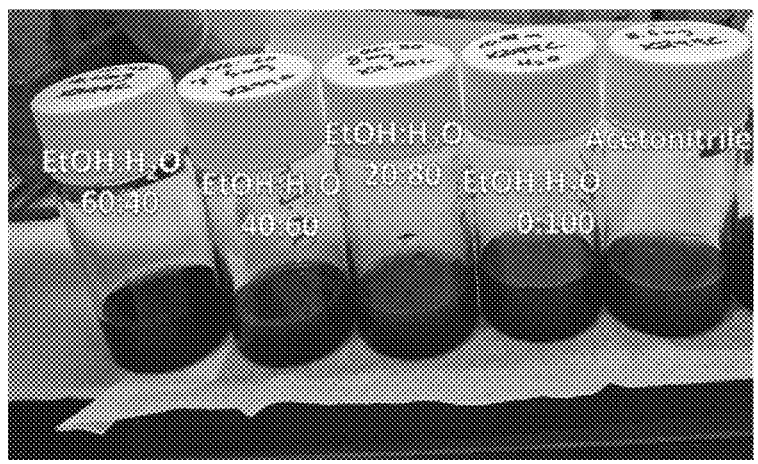
FIG. 6 is a picture of several $CuInSe_xS_{2-x}/ZnS$ QDs dispersion in different ratio of ethanol/water solution and in acetonitrile

In a deaerated round bottom flask, a solution of core/shell quantum dots similar to EXAMPLE 1 was created by reacting with a solution containing 2-(diethylamino)ethanethiol at between 100-150° C. from 60 min to 24 h. The resulting quantum dots could be dispersed in a mixture of ethanol and water at a pH in the range of 2-6 (see FIG. 5 and FIG. 6).

Example 4

This example illustrates the effect of QD concentration on the pH and dispersibility of QDs made in accordance with the teachings herein.

A solution of $CuInSe_xS_{2-x}/ZnS$ (where $0 \leq x \leq 2$) quantum dots QDs, made by the method described in EXAMPLE 1, then was dispersed by addition of an $EtOH/H_2O$ medium having a pH of 2.5. The initial 2 mg/mL dispersion was serially diluted by the addition of additional pH 2.5 ($EtOH/H_2O$) medium to obtain dispersions with concentrations decreasing to 0.0625 mg/mL (see FIG. 5).

As concentration decreased from 2 to 0.0625 mg/mL, the pH decreased from 6.8 to 2.6. At concentrations of 2 mg/mL or less, the QDs remain well dispersed. This suggests that the QDs disperse effectively into a pH 2.5 solution of water/ethanol, however, after which (unexpectedly) the pH of the solution can increase significantly.

Example 5

This example illustrates the effect of pH on dispersion stability.

A series of five 1 mg/mL dispersions of $CuInSe_xS_{2-x}/ZnS$ (where $0 \leq x \leq 2$) quantum dots QDs, made by the method described in EXAMPLE 1 were prepared in $EtOH/H_2O$. The neat $EtOH/H_2O$ solutions were prepared to have approximate pHs of 2, 2.6, 3, 3.5 and 4 using HCl and then 1 mg/mL QDs was added into each of these solutions, the pHs of the resulting dispersion were increased to 2.3, 3, 7.9, 8.3 and 8.8, respectively. Initially, all dispersions appeared stable. However, upon close inspection after a period of time, only the dispersion with a pH of 3.0 maintained dispersibility.

The measured pH after adding the QDs to the liquid medium was as shown in TABLE 1 below:

TABLE 1

| pH Before and After QD Addition | | |
|---|---|---|
| Dispersion # | Initial pH | pH After QD Addition |
| 1 | 2 | 2.3 |
| 2 | 2.6 | 3 |
| 3 | 3 | 7.9 |
| 4 | 3.5 | 8.3 |
| 5 | 4 | 8.8 |

After approx. 3 hours, all dispersions except dispersion #1 had settled out. The optimal pH values for a long time stability (>3 h) may be roughly <3.0 under these conditions.

Example 6

This example illustrates that higher concentrations are possible in dispersions of the type disclosed herein if pH can be maintained within the range of about 2.6-3.0.

Dispersions of QDs in $EtOH/H_2O$ were prepared as in EXAMPLE 4 to yield suspensions with a concentration in excess of 2 mg/mL. Sequentially, HCl was added to the dispersions (decreasing pH), followed by QD solution addition (increasing pH) to maintain the pH between 2.6 and 3.0. It was found that this approach allowed concentration to be increased significantly up to 5.6 mg/mL while maintaining good dispersibility.

Example 7

This example illustrates solubility of QDs in different ratio of $EtOH/H_2O$ and in different solvents.

QDs were dispersed in $EtOH:H_2O$ ratio of 80:20, 60:40, 40:60, 20:80 and 0:100 at pH 2.5-3.0, also in acetonitrile. The QDs had a good solubility in $EtOH:H_2O$ ratio of 80:20 and in 60:40. All other dispersions were turbid (see FIG. 6).

6. Additional Comments

Various modifications, substitutions, combinations, and ranges of parameters may be made or utilized in the compositions, devices and methodologies described herein. For example, various liquid media may be utilized to produce the formulations described herein. These include, without limitation, liquid media comprising acetonitrile, dioxane, and aqueous solutions of methanol, ethanol, isopropanol and butanol.

What is claimed is:

1. A composition, comprising:
   a liquid medium with a pH of less than 6; and
   a plurality of nanoparticles suspended in said liquid medium;
   wherein each of said plurality of nanoparticles includes a nanoparticle and a ligand, and wherein said plurality of nanoparticles, upon excitation with a light source, undergo photoluminescence and exhibit a quantum yield greater than 0.1%, wherein said nanoparticle comprises at least one semiconductor material, and wherein said nanoparticle does not contain any element selected from the group consisting of phosphorus, lead, cadmium and mercury.

2. The composition of claim 1, wherein each of said plurality of nanoparticles comprises at least one material selected from the group consisting of $CuInS_2$, $CuInSe_2$, $AgInS_2$, $AgInSe_2$, ZnS and ZnSe.

3. The composition of claim 1, wherein said ligand is selected from the group consisting of 2-(diethylamino)ethanethiol and 3-(dimethylamino)propanethiol.

4. The composition of claim 1, wherein said photoluminescence is characterized by light emission in the range of 400 nm to 1300 nm.

5. The composition of claim 1, wherein said liquid medium has a pH within the range of 2 to 5.

6. The composition of claim 1, wherein said plurality of nanoparticles forms a clear colloidal dispersion at pH values less than 6.

7. The composition of claim 1, wherein said plurality of nanoparticles forms a clear colloidal dispersion at pH values less than 3.5.

8. The composition of claim 1, wherein said plurality of nanoparticles forms a clear colloidal dispersion at pH values within the range of 2.5 to 3.1.

9. The composition of claim 1, wherein said liquid medium is a mixture of ethanol and water or methanol and water or isopropanol and water or butanol and water.

10. The composition of claim 1, wherein said liquid medium is dioxane.

11. The composition of claim 1, wherein said liquid medium is acetonitrile.

12. The composition of claim 1, wherein each of said plurality of nanoparticles includes (a) a nanoparticle containing at least one inorganic material selected from the group consisting of $CuInS_2$, $CuInSe_2$, $AgInS_2$, $AgInSe_2$, ZnS and ZnSe; and (b) a plurality of ligands selected from the group consisting of 2-(diethylamino)ethanethiol and 3-(dimethylamino)propanethiol.

13. The composition of claim 12, wherein said plurality of nanoparticles forms a clear colloidal dispersion in a liquid medium at pH values less than 6.

14. The composition of claim 12, wherein said plurality of nanoparticles forms a clear colloidal dispersion in a liquid medium at pH values less than 3.5.

15. The composition of claim 12, wherein said plurality of nanoparticles forms a clear colloidal dispersion in a liquid medium at pH values within the range of 2.5 to 3.1.

16. The composition of claim 12, wherein said plurality of nanoparticles is photoluminescent and has an emissions spectrum having a maximum emission at wavelengths within the range of 400 nm to 1300 nm.

17. The composition of claim 16, wherein said nanoparticle has photoluminescence characterized by a quantum yield of at least 1%.

18. The composition of claim 1, wherein said composition comprises:
   a plurality of nanoparticles are acid-stable nanoparticles, and wherein each nanoparticle contains (a) a core comprising a semiconductor, (b) at least one shell which at least partially surrounds the core, and (c) at least one ligand attached to said at least one shell.

19. The composition of claim 18, wherein said composition exhibits an emission, in a liquid medium including at least one polar solvent, which is tunable at least from 400 nm to 1400 nm in a single system with a photoluminescence quantum yield of at least 0.1%.

* * * * *